United States Patent
Middelesch et al.

(10) Patent No.: US 11,283,770 B2
(45) Date of Patent: Mar. 22, 2022

(54) DERIVING A SECURITY KEY FOR RELAYED COMMUNICATION

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Erwin Willem Middelesch, The Hague (NL); Sander De Kievit, Tokyo (JP)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, S-Gravenhage (NL)

( * ) Notice: Subject to any disclaimer, the term of this patent is extended or adjusted under 35 U.S.C. 154(b) by 159 days.

(21) Appl. No.: 16/347,362

(22) PCT Filed: Nov. 6, 2017

(86) PCT No.: PCT/EP2017/078326
§ 371 (c)(1),
(2) Date: May 3, 2019

(87) PCT Pub. No.: WO2018/083298
PCT Pub. Date: May 11, 2018

(65) Prior Publication Data
US 2019/0327611 A1    Oct. 24, 2019

(30) Foreign Application Priority Data
Nov. 7, 2016 (EP) ..................... 16197564

(51) Int. Cl.
*H04L 9/32* (2006.01)
*H04L 29/06* (2006.01)
(Continued)

(52) U.S. Cl.
CPC ........ *H04L 63/0272* (2013.01); *H04L 63/061* (2013.01); *H04W 12/03* (2021.01);
(Continued)

(58) Field of Classification Search
CPC ........... H04W 12/04031; H04W 12/02; H04W 12/0013; H04W 36/03; H04W 36/038; H04L 63/0272; H04L 63/061
(Continued)

(56) References Cited

U.S. PATENT DOCUMENTS 8,995,330 B2 * 3/2015 Morioka ............. H04W 72/005
370/315
9,226,142 B2 * 12/2015 Fukuda ............... H04W 12/041
(Continued)

FOREIGN PATENT DOCUMENTS

| WO | 2016/003750 A1 | 1/2016 |
|---|---|---|
| WO | 2016/116191 A1 | 7/2016 |
| WO | 2016/124549 A1 | 8/2016 |

OTHER PUBLICATIONS

PCT Search Report and Written Opinion, PCT International Application No. PCT/EP2017/078326, dated Jan. 5, 2018, 11 pages.
(Continued)

*Primary Examiner* — Amare F Tabor
(74) *Attorney, Agent, or Firm* — McDonnell Boehnen Hulbert & Berghoff LLP

(57) ABSTRACT

A device (1) is configured to derive a first security key based on information relating to a first node (17), to request use of or to use a further device (9) as a relay to the mobile communication network and to determine whether the further device is connected to the first node and/or receive a message when another device, e.g. the first node, has determined that the further device is not connected to the first node. The device is further configured to, upon determining
(Continued)

that the further device is not connected to the first node or upon receipt of the message, derive a second security key based on information relating to a second node (11) to which the further device is connected and transmit information via the further device, the information being encrypted using the second security key.

16 Claims, 13 Drawing Sheets

(51) Int. Cl.
| | | |
|---|---|---|
| *H04W 36/00* | (2009.01) | |
| *H04W 12/03* | (2021.01) | |
| *H04W 12/033* | (2021.01) | |
| *H04W 12/041* | (2021.01) | |
| *H04W 12/0431* | (2021.01) | |

(52) U.S. Cl.
CPC ....... *H04W 12/033* (2021.01); *H04W 12/041* (2021.01); *H04W 12/0431* (2021.01); *H04W 36/0038* (2013.01); *H04W 36/03* (2018.08)

(58) Field of Classification Search
USPC .......................................................... 713/171
See application file for complete search history.

(56) References Cited

U.S. PATENT DOCUMENTS

| | | | |
|---|---|---|---|
| 9,510,190 B2* | 11/2016 | Zhang | H04L 63/0428 |
| 10,004,014 B2* | 6/2018 | Bergstrom | H04W 12/04 |
| 10,079,822 B2* | 9/2018 | Stojanovski | H04L 9/3247 |
| 10,212,585 B2* | 2/2019 | Zhang | H04L 9/08 |
| 2014/0133656 A1* | 5/2014 | Wurster | H04W 12/08 380/270 |
| 2015/0012743 A1 | 1/2015 | Holtmanns et al. | |
| 2016/0205555 A1 | 7/2016 | Agiwal et al. | |
| 2017/0344739 A9* | 11/2017 | Farina | H04L 63/0272 |

OTHER PUBLICATIONS

European Search Report, European Patent Application No. 16197564.4, dated Mar. 1, 2017, 8 pages.

3GPP TS 33.401 V13.4 0, "3rd Generation Partnership Project; Technical Specification Group Services and System Aspects; 3GPP System Architecture Evolution (SAE); Security Architecture (Release 13)", Sep. 2016, pp. 1-149.

3GPP TS 33.220 V6.4.0, "3rd Generation Partnership Project; Technical Specification Group Services and System Aspects; Generic Authentication Architecture (GAA); Generic Bootstrapping Architecture (Release 6)", Mar. 2005, pp. 1-38.

3GPP TR 33.899 V0.4.1, "3rd Generation Partnership Project; Technical Specification Group Services and System Aspects; Study on the Security Aspects of the Next Generation System (Release 14)", Aug. 2016, pp. 1-156.

3GPP TR 33.899 V0.5.0, "3rd Generation Partnership Project; Technical Specification Group Services and System Aspects; Study on the Security Aspects of the Next Generation System (Release 14)", Oct. 2016, pp. 1-244.

3GPP TS 23.303 V13.5.0, "3rd Generation Partnership Project; Technical Specification Group Services and System Aspects; Proximity-Based Services (ProSe); Stage 2 (Release 13)", Sep. 2016, pp. 1-124.

3GPP TS 33.303 V13.4.0, "3rd Generation Partnership Project; Technical Specification Group Services and System Aspects; Proximity-Based Services (ProSe); Security Aspects (Release 13)", Jun. 2016, pp. 1-89.

3GPP TS 23.002 V14.0.0, "3rd Generation Partnership Project; Technical Specification Group Services and System Aspects; Network Architecture (Release 14)", Sep. 2016, pp. 1-113.

3GPP TS 23.401 V13.8.0, "3rd Generation Partnership Project; Technical Specification Group Services and System Aspects; General Packet Radio Service (GPRS) Enhancements for Evolved Universal Terrestrial Radio Access Network (E-UTRAN) Access (Release 13)", Sep. 2016, pp. 1-374.

* cited by examiner

DERIVING A SECURITY KEY FOR RELAYED COMMUNICATION

CROSS REFERENCE TO RELATED APPLICATIONS

The present application is a national stage entry of, and claims priority to, PCT/EP2017/078326, filed on Nov. 6, 2017, which claims priority to European Patent Application EP 16197564.4, filed in the European Patent Office on Nov. 7, 2016, both of which are hereby incorporated in their entirety herein by reference.

FIELD OF THE INVENTION

The invention relates to a device for transmitting encrypted information to a mobile communication network and a system for directing such a device.

The invention further relates to a method of transmitting encrypted information to a mobile communication network and a method of directing a device for transmitting encrypted information.

The invention also relates to a computer program product enabling a computer system to perform any of such methods.

BACKGROUND OF THE INVENTION

The amount of devices that is able to connect to the Internet is expected to grow enormously, especially as a result of everyday objects having network connectivity. Not only do users communicate via Internet-connected devices, but devices also send data, e.g. sensor data or maps, to other devices (machine-to-machine communication) over the Internet. It is estimated that by the year 2020 50 billion devices will be connected. Therefore, it is no surprise that industry efforts and investments are directed towards this field.

The category of mobile devices, e.g. mobile phones, tablets, wearable devices and devices embedded in vehicles, is an important category of devices that is able to connect to the Internet. In order to e.g. reduce power consumption, it is advantageous to tether certain devices, e.g. wearable devices, to other devices, e.g. smart phones. When these certain devices do not trust these other devices, but do trust the mobile communication network to which these other devices are connected, protection of data between these certain devices and the mobile communication becomes important.

WO 2016/003750 discloses techniques for securely receiving critical communication content associated with a critical communication service. A secure connection from the critical communication service to remote user equipment (UE) may be established through a relay UE in order for the remote UE to securely receive critical communication content from the critical communication service. The remote UE and the critical communication service agree on common key material that can be used to securely relay a master session key, which may be for use by only the remote UE to decrypt encrypted critical communication content sent from the critical communication service and routed through the relay UE.

A drawback of these techniques is that each service requires the setup of an own end-to-end secure tunnel. A solution in which a secure tunnel between a remote UE and the mobile communication network may be used by multiple services is preferable. 3GPP TS 33.401 (v13.4.0; System Architecture Evolution (SAE); Security architecture) specifies how a security key for encrypting communication between a UE and an eNodeB in an LTE mobile communication network should be derived. 3GPP TS 33.401 does not specify how a security key for encrypting communication between a remote UE and an eNodeB should be derived. This is not trivial. When determining how to derive a security key for a remote UE, it should be taken into account that a remote UE may be handed over to a different device (e.g. a different relay UE or a relay UE instead of an eNodeB) and that the relay UE to which the remote UE is connected may be handed over to a different eNodeB.

SUMMARY OF THE INVENTION

It is a first object of the invention to provide a device for transmitting encrypted information to a mobile communication network, which allows the device to relay information via a further device without requiring the device to setup a secure tunnel with each service separately.

It is a second object of the invention to provide a system for directing a device for transmitting encrypted information, which allows the device to relay information via a further device without requiring the device to setup a secure tunnel with each service separately.

It is a third object of the invention to provide a method of transmitting encrypted information to a mobile communication network, which allows a device to relay information via a further device without requiring the device to setup a secure tunnel with each service separately.

It is a fourth object of the invention to provide a method of directing a device for transmitting encrypted information, which allows the device to relay information via a further device without requiring the device to setup a secure tunnel with each service separately.

According to the invention, the first object is realized in that the device for transmitting encrypted information to a mobile communication network comprises a communication interface and at least one processor configured to derive a first security key based on information relating to a first node, to use said communication interface to request use of or to use a further device as a relay to said mobile communication network, to determine whether said further device is connected to said first node and/or receive a message when another device has determined that said further device is not connected to said first node, and upon determining that said further device is not connected to said first node or upon receipt of said message: to derive a second security key based on information relating to a second node of said mobile communication network to which said further device is connected, and to use said communication interface to transmit information to said mobile communication network via said further device, said information being encrypted using said second security key.

The security keys may also be used by the device for integrity protection and for decoding encrypted information received from the mobile communication network via the further device. The second node may be able to derive the second security key in the same manner as the device.

The inventors have recognized that by deriving a security key based on information relating to a node of the mobile communication network, e.g. an LTE eNodeB, communication between the device and the mobile communication network is sufficiently secure and does not require a secure tunnel to be setup with each service separately, but that a device that is relayed via a further device is not able to obtain this information in the same manner as a device that is connected to a node of the mobile communication network.

The inventors have recognized that by having the device derive the security key based on information relating to the node to which the further device is connected, the latter problem is solved.

Said at least one processor may be configured to derive said second security key as part of a handover of said device from said first node to said second node. This way, the device may be handed over in a similar manner as the further device to which the device is connected.

Said at least one processor may be configured to request said handover upon receiving said message. This first node or the second node may send this message, for example, when the further device to which the device is connected is not or is no longer the same node as the node with which the device has been associated. The device may be associated with the last node to which it connected, e.g. if it is no longer connected to any node. The device may send a 'relay discovered' message or may send a measurement report which includes the signal from the second node as measurement to the mobile communication network in order to ensure that it gets handed over to the second node, for example.

Said at least one processor may be configured to use said communication interface to connect to said second node and obtain said information relating to said second node from said second node. This way, the device may obtain the information relating to the second node without having to rely on information from the first node or the further device.

Said information relating to said second node may comprise a random number generated by said second node. This makes it easier to handover the secure tunnel together with the security context to another node, e.g. another eNodeB. This handed-over secure tunnel may be used for a little while before a key refresh is performed, for example.

Said information relating to said second node may comprise information obtained by monitoring an air interface and which identifies said second node. This information may be obtained after connecting to said second node, for example. This allows already existing information to be used, e.g. LTE Cell ID and Evolved Radio Frequency Channel Number (EARFCN).

Said information relating to said second node may comprise information received from said further device. This allows the node to obtain the information without having to connect to the second node first.

Said information relating to said second node may comprise information relating to a Proximity Services session between said device and said further device. If the relay connection is established with the help of Proximity Services, this is a convenient way of obtaining the information relating to the second node.

Said at least one processor may be configured to generate a random number and to derive said second security key based on information relating to said second node and based on said random number generated by said at least one processor. This makes it easier to handover the secure tunnel together with the security context to another node, e.g. another eNodeB. This handed-over secure tunnel may be used for a little while before a key refresh is performed, for example.

Said at least one processor may be configured to use said communication interface to transmit said random number generated by said at least one processor to said further device or to said second node. This makes it easier to handover the secure tunnel together with the security context to another node, e.g. another eNodeB. This handed-over secure tunnel may be used for a little while before a key refresh is performed, for example.

According to the invention, the second object is realized in that the system for directing a device for transmitting encrypted information comprises a communication interface and at least one processor configured to determine whether a device wants to use or is using a further device as a relay to a mobile communication network and upon determining that said device wants to use or is using a further device as a relay to said mobile communication network: to determine a node of said mobile communication network with which said device is associated, to determine a further node of said mobile communication network to which said device is connected or wants to connect, and to use said communication interface to direct said device to derive a new security key based on information relating to said further node if said node and said further node are not the same node.

According to the invention, the third object is realized in that the method of transmitting encrypted information from a device to a mobile communication network comprises deriving a first security key based on information relating to a first node, using or requesting use of a further device as a relay to said mobile communication network, determining whether said further device is connected to said first node and/or receiving a message when another device has determined that said further device is not connected to said first node, and upon determining that said further device is not connected to said first node or upon receipt of said message: deriving a second security key based on information relating to a second node of said mobile communication network to which said further device is connected and transmitting information to said mobile communication network via said further device, said information being encrypted using said second security key.

According to the invention, the fourth object is realized in that the method of directing a device for transmitting encrypted information comprises determining whether a device wants to use or is using a further device as a relay to a mobile communication network and upon determining that said device wants to use or is using a further device as a relay to a mobile communication network: determining a node of said mobile communication network with which said device is associated, determining a further node of said mobile communication network to which said device is connected or wants to connect, and directing said device to derive a new security key based on information relating to said further node if said node and said further node are not the same node.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: deriving a first security key based on information relating to said first node, using or requesting use of a further device as a relay to said mobile communication network, determining whether said further device is connected to said first node and/or receiving a message when another device has determined that said further device is not connected to said first node, and upon determining that said further device is not connected to said first node or upon receipt of said message: deriving a second security key based on information relating to a second node of said mobile communication network to which said further device is connected and transmitting information to said mobile communication network via said further device, said information being encrypted using said second security key.

The same or a different non-transitory computer-readable storage medium stores at least one further software code portion, the further software code portion, when executed or processed by a computer, being configured to perform executable operations comprising: determining whether a device wants to use or is using a further device as a relay to a mobile communication network and upon determining that said device wants to use or is using a further device as a relay to a mobile communication network: determining a node of said mobile communication network with which said device is associated, determining a further node of said mobile communication network to which said device is connected or wants to connect, and directing said device to derive a new security key based on information relating to said further node if said node and said further node are not the same node.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
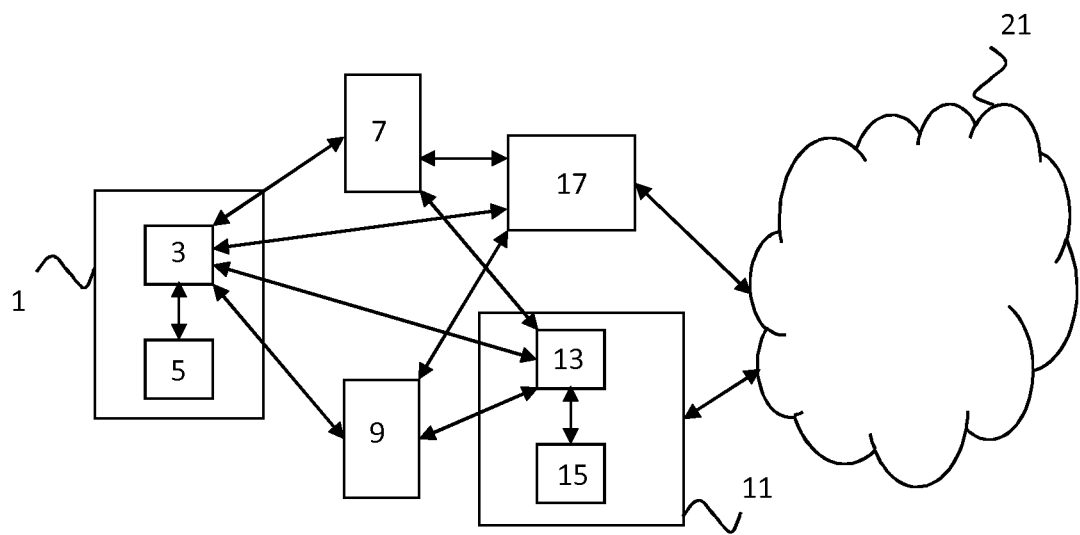
FIG. 1 is a block diagram of an embodiment of the system and device of the invention.

FIG. 1 shows a mobile device 1 (also referred to as remote UE in this description), which is an embodiment of the device for transmitting encrypted information to a mobile communication network of the invention, further devices 7 and 9 (also referred to as relay UEs in this description), which may relay the encrypted information for mobile device 1 to the mobile communication network, a first access point 17 and a second access point 11 (also referred to as eNBs in this description). Second access point 11 is an embodiment of a system for directing the device of the invention. First access point 17 may be an embodiment of the system for directing the device of the invention as well. First access point 17 and second access point 11 are nodes of the mobile communication network and are connected to the Core Network 21.

The mobile device 1 comprises a communication interface 3 and a processor 5. The processor 5 is configured to derive a first security key based on information relating to the first access point 17, to use the communication interface 3 to request use of or to use the further device 9 as a relay to the mobile communication network and to determine whether the further device 9 is connected to the first access point 17 and/or receive a message when another device has determined that the further device 9 is not connected to the first access point 17.

The processor 5 is further configured to, upon determining that the further device 9 is not connected to the first access point 17 or upon receipt of the message, derive a second security key based on information relating to a second access point 11 of the mobile communication network to which the further device 9 is connected and to use the communication interface 3 to transmit information to the mobile communication network via the further device 9, the information being encrypted using the second security key. The processor 5 may be configured to derive the second security key as part of a handover of the mobile device 1 from the first access point 17 to the second access point 11. The processor 5 may be configured to request the handover upon receiving the message.

The second access point 11 comprises a communication interface 13 and a processor 15. The processor 15 is configured to determine whether the mobile device 1 wants to use or is using a further device 9 as a relay to a mobile communication network and upon determining that the device 1 wants to use or is using a further device 9 as a relay to the mobile communication network: to determine a first access point 17 of the mobile communication network with which the mobile device 1 is associated, to determine a second access point 11 of the mobile communication network to which the mobile device 1 is connected or wants to connect, and to use the communication interface 13 to direct the mobile device 1 to derive a new security key based on information relating to the second access point 11 if the first access point 17 and the further access point 11 are not the same node.

The mobile device 1 may be, for example, a wearable device like virtual reality glasses, a smart watch, augmented reality glasses, earphones, a hearing aid, a glucose sensor, a body temperature sensor, a blood pressure sensor, an insulin pump, a heart rate sensor, a GPS sensor or an accelerometer. Alternatively, the mobile device 1 may be, for example, a car that connects to the mobile device of the driver. The mobile device 1 may also be a device that the user may carry, use or interact with only occasionally and is connected to his/her mobile device only occasionally, e.g. a game console, a wireless toy, a wireless keyboard, a tablet, a screen, a beamer, or a musical instrument. The further devices 7 and 9 may each be a smart phone, a laptop or a tablet, for example. The further devices 7 and 9 may each have a slot for a UICC (also called a SIM card) or be provisioned with an embedded or enhanced version thereof for storage of credentials, for example.

In the embodiment shown in FIG. 1, the mobile device 1 comprises one processor 5. In an alternative embodiment, the mobile device 1 comprises multiple processors. In the embodiment shown in FIG. 1, the second access point 11 comprises one processor 15. In an alternative embodiment, the second access point 11 comprises multiple processors.

The communication interface 3 of the mobile device 1 may use LTE Proximity Services (including LTE D2D) to communicate with the further devices 7 and/or 9, for example. Alternatively or additionally, the communication interface 3 of the mobile device 1 may use Body Area Network (BAN)/Personal Area Network (PAN) technologies such as Bluetooth (Low Energy), NFC, and ZigBee to communicate with the further devices 7 and/or 9, for example. The communication interface 3 of the mobile device 1 may use WiFi, Ethernet or one or more cellular communication technologies such as GPRS, CDMA, UMTS and/or LTE to communicate with the first access point 17 and/or the second access point 11, for example. The processor 5 may be a general-purpose processor, e.g. an ARM or a Qualcomm processor, or an application-specific processor. The mobile device 1 may comprise storage means (not shown), e.g. solid state memory. The mobile device 1 may comprise other components typical for a mobile device, e.g. a random access memory and a battery.

The communication interface 3 of the second access point 11 may use WiFi, Ethernet or one or more cellular communication technologies such as GPRS, CDMA, UMTS and/or LTE to communicate with the mobile device 1 and the further devices 7 and 9, for example. The processor 15 is preferably a general-purpose processor, e.g. an Intel or an AMD processor. The processor 15 may comprise multiple cores, for example. The processor 15 may run a Unix-based or Windows operating system, for example. The second access point 11 may comprise other components typical for a component in a mobile communication network, e.g. a power supply and a random access memory. The second access point 11 may comprise storage means (not shown). The storage means may comprise solid state memory, e.g. one or more Solid State Disks (SSDs) made out of Flash memory, or one or more hard disks, for example.

In a first embodiment of the mobile device 1, the processor 5 is configured to use the communication interface 3 to connect to the second access point 11 and obtain the information relating to the second access point 11 from the second access point 11. The information relating to the second access point 11 may comprise information obtained by monitoring an air interface and which identifies the second access point 11.

In a second embodiment of the mobile device 1, the information relating to the second access point 11 comprises a random number generated by the second access point 11 instead of or in addition to information obtained by monitoring an air interface and which identifies the second access point 11. The processor 5 may be configured to generate a random number and to derive the second security key based on information relating to the second access point 11 and based on the random number generated by processor 5. The processor 5 may be configured to use the communication interface 3 to transmit the random number generated by the processor 5 to the further device 9 (which may then forward it to the second access point 11) or to the second access point 11.

In a third embodiment of the mobile device 1, the information relating to the second access point 11 comprises information obtained by monitoring an air interface and which identifies the second access point 11. The information relating to the second access point 11 may comprise information received from the further device 9, which may be compared with the information obtained by monitoring the air interface to check its correctness, for example.

In a fourth embodiment, the information relating to the second access point 11 may alternatively or additionally comprise information relating to a Proximity Services session between the device 1 and the further device 9. This information may be received from the further device 9, for example.

Figure 2:
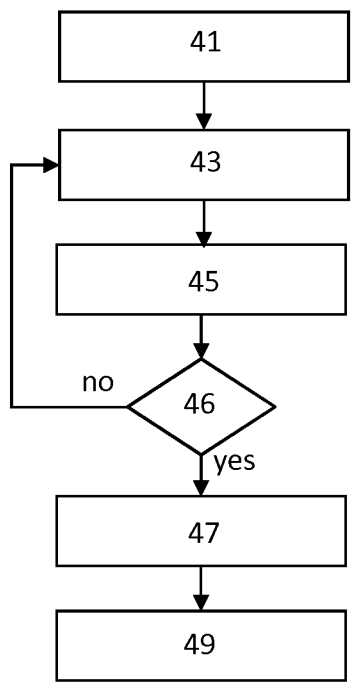
FIG. 2 is a flow diagram of an embodiment of the method of transmitting encrypted information from a device to a mobile communication network of the invention.

A flow diagram of an embodiment of the method of transmitting encrypted information from a device to a mobile communication network is shown in FIG. 2. A step 41 comprises deriving a first security key based on information relating to a first node. A step 43 comprises using or requesting use of a further device as a relay to the mobile communication network. A step 45 comprises determining whether the further device is connected to the first node and/or receiving a message when another device has determined that the further device is not connected to the first node. A step 47 comprises, upon determining that the further device is not connected to the first node or upon receipt of the message in decision point 46 (if not, the method returns to step 43), deriving a second security key based on information relating to a second node of the mobile communication network to which the further device is connected. A step 49 comprises transmitting information to the mobile communication network via the further device. The information is encrypted using the second security key derived in step 47.

Figure 3:
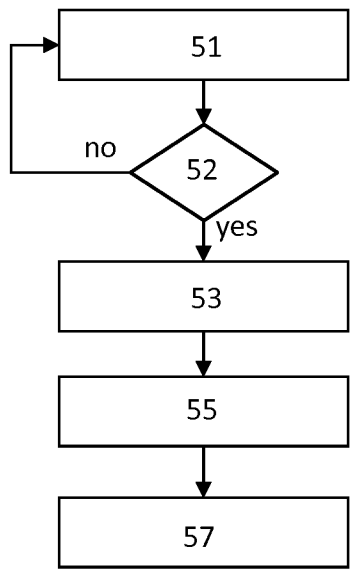
FIG. 3 is a flow diagram of an embodiment of the method of directing a device for transmitting encrypted information of the invention.

A flow diagram of an embodiment of the method of directing a device for transmitting encrypted information is shown in FIG. 3. A step 51 comprises determining whether a device wants to use or is using a further device as a relay to a mobile communication network. A step 53 comprises, upon determining that the device wants to use or is using a further device as a relay to a mobile communication network in decision point 52 (if not, the method returns to step 51), determining a node of the mobile communication network with which the device is associated. A step 55 comprises, upon determining that the device wants to use or is using a further device as a relay to a mobile communication network in decision point 52, determining a further node of the mobile communication network to which the device is connected or wants to connect. A step 57 comprises directing the device to derive a new security key based on information relating to the further node if the node, as determined in step 53, and the further node, as determined in step 55, are not the same node.

The invention is explained in more detail with the help of FIGS. 4 to 14. Although the provided examples are based on the LTE standard and refer to LTE components, the invention may also be used in other cellular communication networks and with similar components of those networks.

Figure 4:
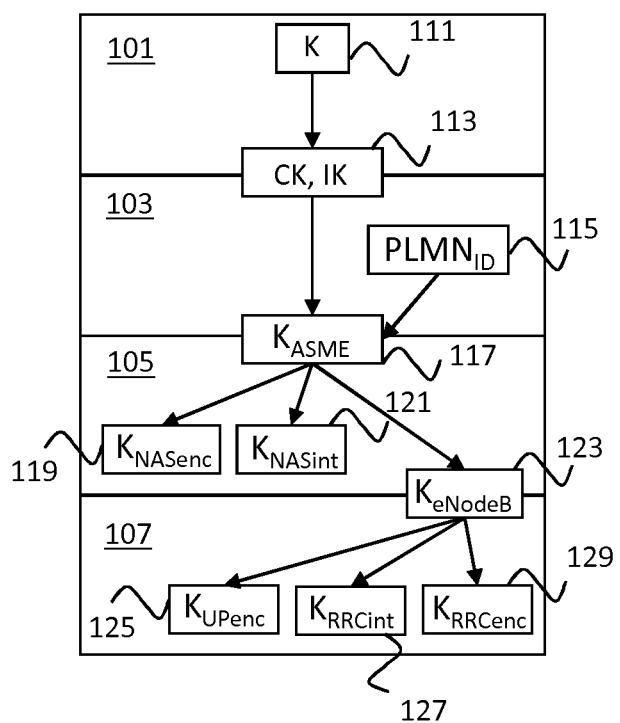
FIG. 4 shows keys used in an LTE mobile communication network.

FIG. 4 shows keys used for encryption between UE and eNB in LTE. RRC and NAS signaling may be encrypted using RRC and NAS keys, respectively. For user plane encryption, a KUP key may be used.

All key derivations described hereinafter are performed using the following formula (specified in 3GPP TS 33.220): derived key=HMAC-SHA-256 (Key, S).

For brevity, the formula is also denoted as "KDF (Key, S)". The string S is built up from several components, one being an FC-value to separate the key derivations. Also, the String S often contains lengths (denoted Ln) in addition to the value itself. So, a string is constructed, for example, from the following values:

FC=1
P0=KPN
P1=TNO-NL
L0=3
L1=6

The final string S is given by: S=FC∥P0∥L0∥P1∥L1=1KPN3TNO-NL6. Hereinafter, Len will refer to any Ln value and concatenation is denoted by '∥' or '/'.

The key derivations in LTE work as follows for initial attach (specified in 3GPP TS 33.401):

USIM and AuC (Authentication Center) derive CK, IK 113 from K 111 (using for example the Milenage algorithm) in block 101.

UE and HSS derive $K_{ASME}$ 117 from CK, IK 113 and the Serving Network ID (PLMNID) 115 in block 103. $K_{ASME}$=KDF(CK∥IK, FC∥SN_id∥Len∥SQN XOR AK∥Len).

UE and MME derive the NAS Keys ($K_{NASenc}$ 119 and $K_{NASint}$ 121), a $K_{eNB}$ key 123 and an NH key (not shown) from $K_{ASME}$ 117 in block 105. $K_{eNB}$=KDF ($K_{ASME}$, FC∥NAS Count∥Len). NH=KDF ($K_{eNB}$, FC∥$K_{eNB}$/NH∥Len).

UE and eNodeB derive the user plane key $K_{UPenc}$ 125 and the RRC keys ($K_{RRCint}$ 127 and $K_{RRCenc}$ 129) from $K_{eNB}$ in block 107.

Key derivations for $K_{eNB}$ are specified in 3GPP TS 33.401. 3GPP TR 33.899 v0.4.1 specifies options for key hierarchies. 3GPP TR 33.899 v0.5.0 specifies security requirements for relay security, in particular to being able to protect sessions and uniquely identify the remote UE, which are enabled by the present invention by deriving appropriate keys and using these keys to protect the session.

Ciphering on the link between the eNB and the UE may be used to prevent UE tracking based on cell level measurement reports, handover message mapping, or cell level identity chaining. Another reason to provide ciphering for the link between the eNB and the UE is to (optionally) protect the user plane.

Examples of the afore-mentioned four embodiments are described in detail below. These examples are briefly described per embodiment as follows:

1. During handover, the remote UE will always switch back to a direct path between eNB and UE. So, the remote UE will reach back to the eNB to which the relaying UE has been handed over and get the information straight from that eNB and only then switches back to the relay mode.
2. At initial attach, the UE and the eNB derive a special key that is used only the case of relaying and the eNB forwards the key to the next eNB whenever it performs a handover of the relaying UE.
3. The remote UE 'listens in' on the relay UE communication and derives the appropriate key material based on this information.
4. The remote UE and eNB derive the key using information about the relay channel.

Figure 5:
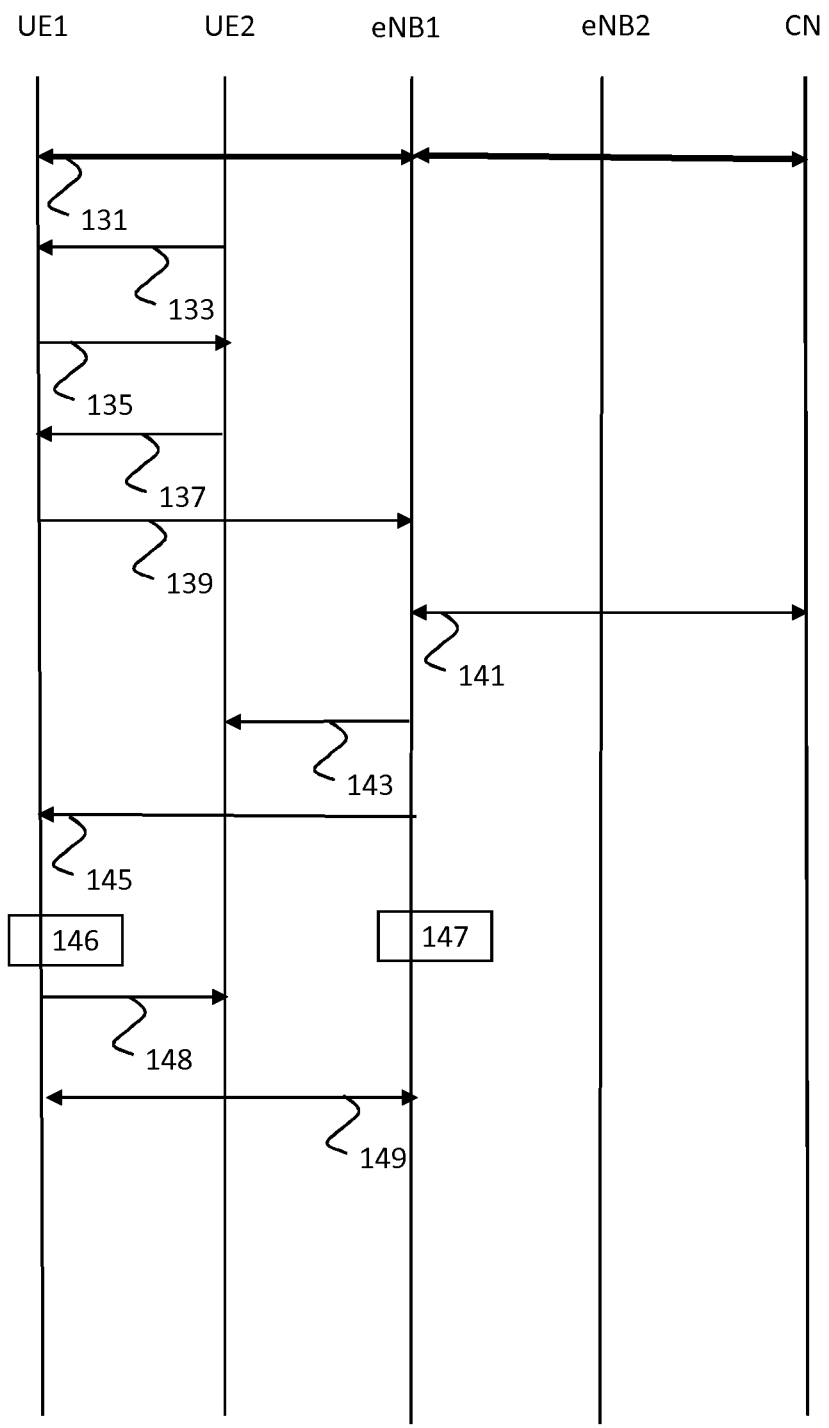
FIG. 5 is a flow diagram showing a first example of a device starting to use a further device as a relay in a first embodiment of the methods.

New keys may need to be derived in the following situations:
a) Switching between direct and relayed mode for the remote UE
b) Handing over the relay UE and the remote UE together
c) Hand over between relay UEs by the remote UE Situation a) is depicted in FIG. 5 as an example of the first embodiment. In this embodiment, the UE always connects back to the network to perform its hand overs. This way, it is able to obtain the eNB dependent parameters.

In step 131, UE1 attaches to the Core Network (CN) via eNB1 in the normal way. In step 133, UE1 discovers a new relay (UE2) based on ProSe (Proximity Services) discovery. ProSe specifies that one of the UEs may broadcast and one of the UEs is listening and so either UE could be the broadcasting UE. In FIG. 5, step 133 may involve UE2 transmitting such a broadcast message or a series of messages to UE1. The broadcast message could be directed to UE1 only, meaning that it could be addressed to UE1 and be visible for everyone to see or that it could be protected by some encryption or obfuscation technique that allows only UE1 to learn its contents. Ultimately, in case UE1 and UE2 are already on the same network, for example a local area network, the broadcast could be exchanged over the alternative network. Also, the broadcast message could be exchanged on an alternative radio network, such as short range networks like WiFi and Bluetooth. The method of message exchange does not matter as long as the message(s) exchanged between UE1 and UE2 contain(s) information that allows UE1 to learn that UE2 is a possible relay, by either exposing its capabilities, group memberships or by broadcasting a known identifier. In case UE1 would broadcast, it would ask for a relay and UE2 could simply answer by saying 'yes'. Also note that the discovering UE may send a match report to the ProSe Function in order to determine whether the broadcast received is a relevant discovery. Alternatively, if UE1 is broadcasting, UE2 could reply to the broadcast and so the 'broadcast' (step 133) and 'connect' (step 135) arrows change direction. Proximity Services is specified in 3GPP TS 23.303 and TS 33.303.

In step 135, UE1 connects to UE2 (it is assumed that UE2 asks for relay resources from the network and obtains these relay resources from the network). In step 137, UE2 confirms to UE1 that the connection has been established. If the direction of the arrow (i.e. of the broadcast) is reversed in step 133, the direction of the arrows may need to be reversed in steps 135 and 137 as well.

In step 139, UE1 asks eNB1 for a handover to UE2. Normally, the network is in charge of handovers, so UE may not be able to literally ask for a handover. Instead, it could send a 'relay discovered' message or it could send a measurement report which includes the signal from UE2 as measurement. Also, a message could be used in which UE1 literally sends a 'please handover to discovered relay UE2' message. Lastly, the handover could be initiated by the network after a ProSe match report was received from UE1 or UE2. In that case, step 139 could be performed by the network instead.

In step 141, eNB1 starts a search to find out who UE2 is. (1) One solution is that UE2 has told UE1 its radio identifier when they connected and UE1 may have included the radio identifier. (2) Another option is that UE1 forwards the ProSe identifier of UE2 and that the eNB does a lookup of the identifier via the Core Network. (3) The eNB may also try to page UE2 based on the identifier it got from UE1. (4) Yet another alternative is that UE2 forwards the handover request to eNB1 including its GUTI/TMSI or C-RNTI or even a bearer identifier of the bearer to be switched. In case step 139 is performed by the network, the eNB will still have to make a mapping between the identifiers known in the Core Network and the identifiers known to the Core Network, or alternatively, the Core Network will have to map between the different identifiers of ProSe and EPS bearer identities in order to identify the respective eNBs that the UEs are connected to and inform the respective eNB (eNB1 in this case) of the findings.

eNB1 may also find out that UE2 is connected to another eNB. This is described in relation to FIG. 6. In the flow diagram shown in FIG. 5, UE2 is also connected to eNB1. Once eNB1 has found out who UE2 is, it will assign new radio resources to UE2 and assign a DRB ID (Data Radio Bearer Identifier) to the bearer for those radio resources. It will also tell UE2 that these radio resources are for relay of data from UE1 in an RRC message in step 143. The new radio bearer(s) for UE1 traffic that are set up between eNB1 and UE2 may use 'NULL' encryption or may be unencrypted bearers. Also, eNB1 may specify that no integrity protection is necessary. Instead, integrity protection for the RRC or UP (if used) may be provided by UE1.

UE1 then switches to UE2 relay in step 148 upon receiving a command thereto from the eNB1 in step 145. New keys are derived by UE1 and eNB1 in steps 146 and 147 (in this example before switching to UE2) as follows: $K_{eNB}$*=KDF ($K_{eNB}$, FC∥Cell ID∥Len∥EARFCN_DL∥Len).

UE1 establishes a PC-5 bearer between UE1 and UE2 in step 149. UE2 forwards traffic between the PC-5 bearer and the radio bearer for UE1. If there is no one-to-one relation between PC-5 bearers and radio bearers, UE1 will have to indicate to UE2 for which bearer the traffic is meant. UE2 will then have to inspect each packet that it receives over the PC-5 bearer (possibly reassemble packets) and forward them to the correct radio bearer. In return, UE2 will have to keep UE1 informed about possible packet counters and retransmissions which may affect the counters (and therefore, the encryption).

Figure 6:
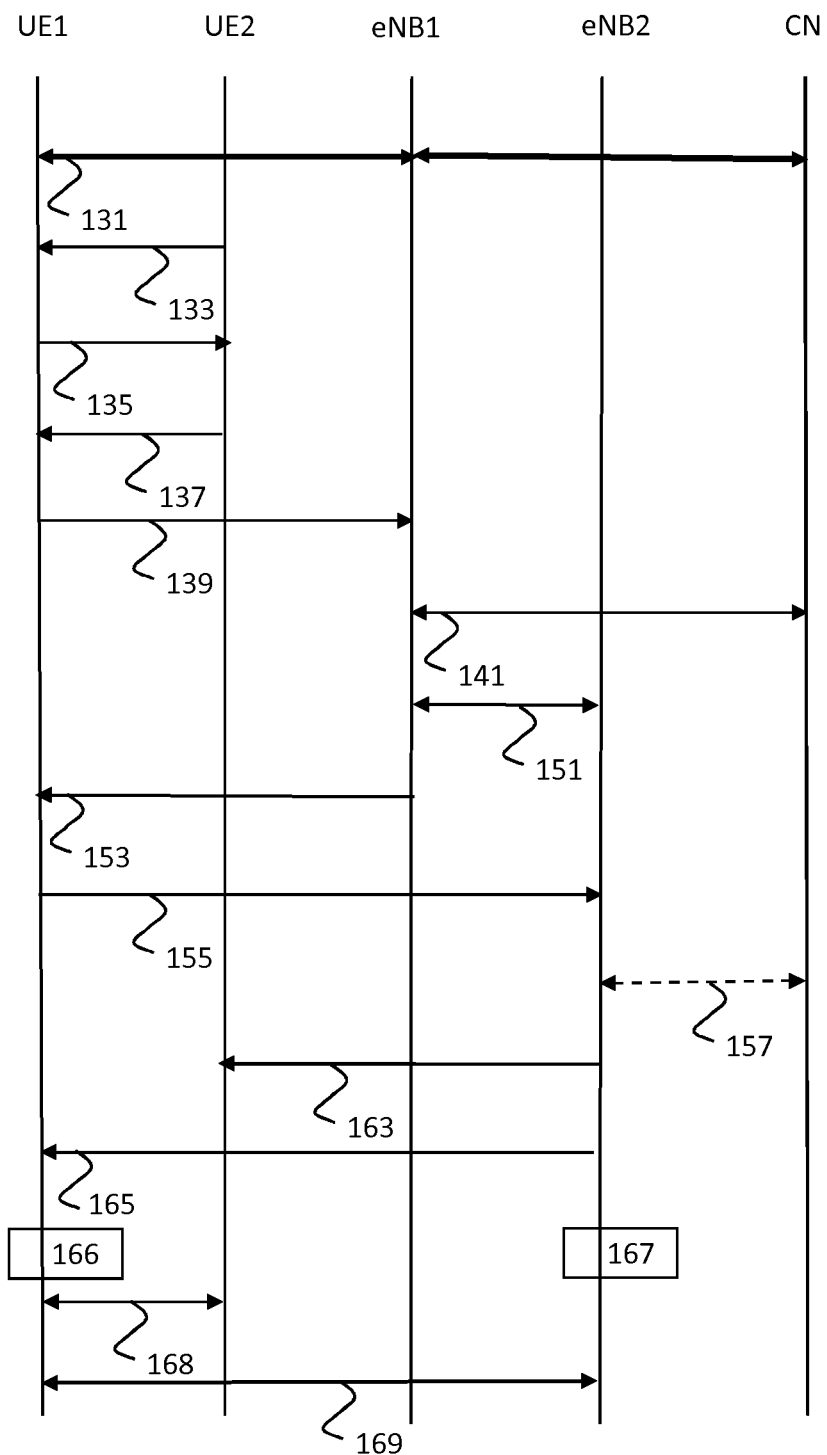
FIG. 6 is a flow diagram showing a second example of a device starting to use a further device as a relay in the first embodiment of the methods.

FIG. 6 shows what would change in the example of FIG. 5 when eNB1 finds out in step 141 that UE2 is connected to another eNB, eNB2 in this case. eNB1 now initiates a handover of UE1 to eNB2 in step 151 and optionally provides eNB2 with the information that it had just obtained about the switched UE1. Next, UE1 is informed in step 153 by eNB1 that it should connect to eNB2 to request the handover to UE2. In step 155, UE1 connects to eNB2 and requests the handover to UE2. If eNB2 did not receive information about who UE2 is from eNB1 in step 151, it finds out in step 157. Steps 163 to 169 correspond to steps 143 to 149 of FIG. 5, but the role of eNB1 is now assumed by eNB2.

Figure 7:
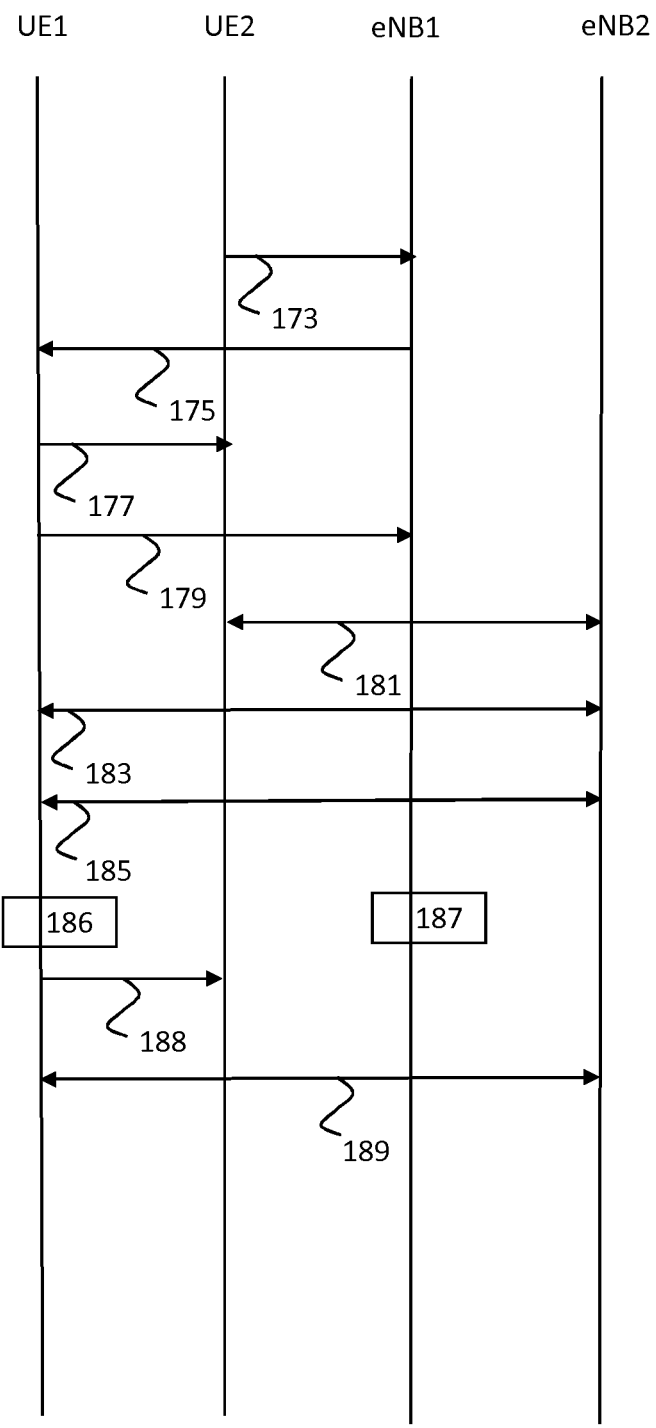
FIG. 7 is a flow diagram showing an example of the further device of FIG. 5 being handed over to another base station.

Situation b) is depicted in FIG. 7 for an example of the first embodiment. UE2 is connected to eNB1, as shown in FIG. 5.

In step 173, UE2 signals eNB1 the need for a handover. UE2 may do this using measurement reports and eNB1 may finally issue the command to handover. Next, eNB1 signals to UE1 the handover pending via UE2 in step 175. UE1 then terminates direct mode in step 177 and connects back to eNB1 directly in step 179. Depending on the communication mode that was used for direct mode, it could simply mean that UE1 stops sending messages (unconfirmed mode) or that it will have to tear down the connection actively (confirmed mode). If the latter, this will require additional signaling between UE1 and UE2 to make sure that the connection was terminated. Meanwhile, UE2 is handed over to eNB2 in step 181.

eNB1 signals in step 175 that UE1 has to handover to eNB2 using normal handover procedures. UE1 does as it is told and hands over to eNB2 in this step 183. The security context is transferred between eNB1 and eNB2 as per the specified procedure. UE1 asks to be handed over back to UE2 in step 185 and if eNB2 agrees, that procedure is performed in this step 185. New keys are derived by UE1 and eNB2 in steps 186 and 187 as follows: $K_{eNB}$*=KDF ($K_{eNB}$, FC∥Cell ID∥Len∥EARFCN_DL∥Len). In step 188, UE1 connects to UE2 again and sets up a secure connection with eNB2 in step 189 based on $K_{eNB}$* derived in step 186. Step 188 may be preceded by another discovery step (not shown), similar to step 133, to determine that the two UEs are still in proximity.

Figure 8:
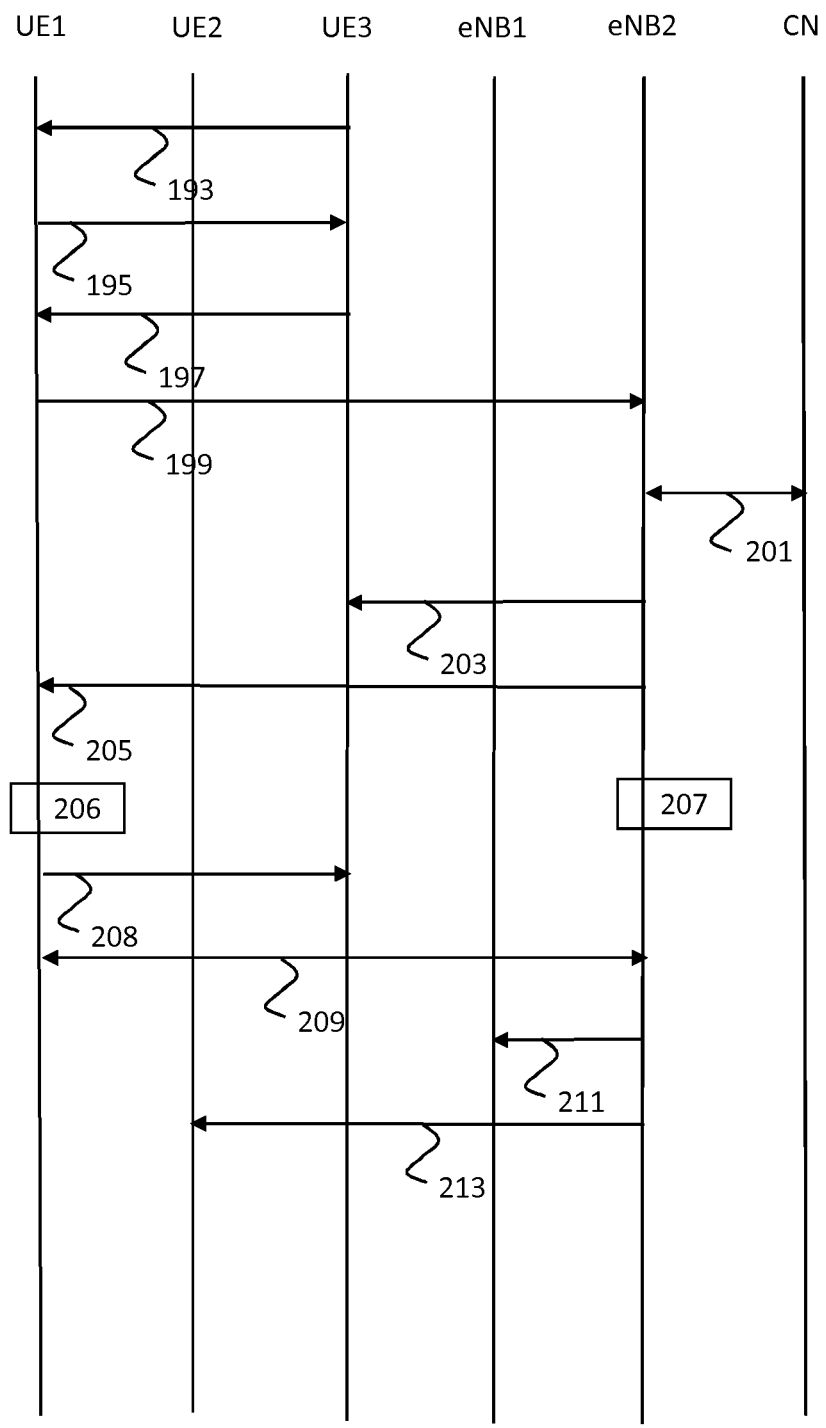
FIG. 8 is a flow diagram showing an example of the device of FIG. 5 starting to use another device as a relay instead of the further device.

Situation c) is depicted in FIG. 8 as an example of the first embodiment. Steps 193 to 208 are similar to steps 133 to 148 of FIG. 5, but now it is UE3 instead of UE2 that UE1 requests to use as a relay and UE3 is connected to eNB2 instead of to eNB1. UE1 previously used UE2 (which was connected to eNB1) as a relay, but UE2 may now be out of range of UE1 or UE2 may no longer be available, e.g. switched off or in flight mode. In step 211, eNB1 is informed that UE1 is gone so that it may clean up its resources. In step 213, UE2 is informed that UE1 is gone so that it may clean up its resources.

The flow diagrams of FIG. 5 and FIG. 6 also apply to the second embodiment in situation a). However, different keys are derived. In this second embodiment, a special relay key is derived that is used to protect the communication between the eNB and the UE. In steps 146 and 147, see FIG. 5, UE1 and eNB1 both derive a $K_{eNB\text{-}relay}$ key that is used specifically for relaying purposes, i.e. to protect the communication between UE1 and eNB1. The key derivation follows the standard key derivation mechanism for the derivation of the $K_{eNB}$. The inputs to the key derivation function are the following:

Cell-ID: Random number A provided by UE1
EARFCN_DL: Random number B, provided by eNB1.

The key is derived as follows: $K_{eNB\text{-}relay}$=KDF($K_{eNB}$, FC∥A∥Len∥B∥Len). The random number A is provided by the UE1 to eNB1 in step 139, see FIG. 5. The random number B is provided by eNB1 to UE1 in step 145, see FIG. 5. A secure tunnel is established between UE1 and eNB1 in step 149, see FIG. 5, based on the key derived in steps 146 and 147 or based on a lower key, such as an integrity key and an encryption key.

Figure 9:
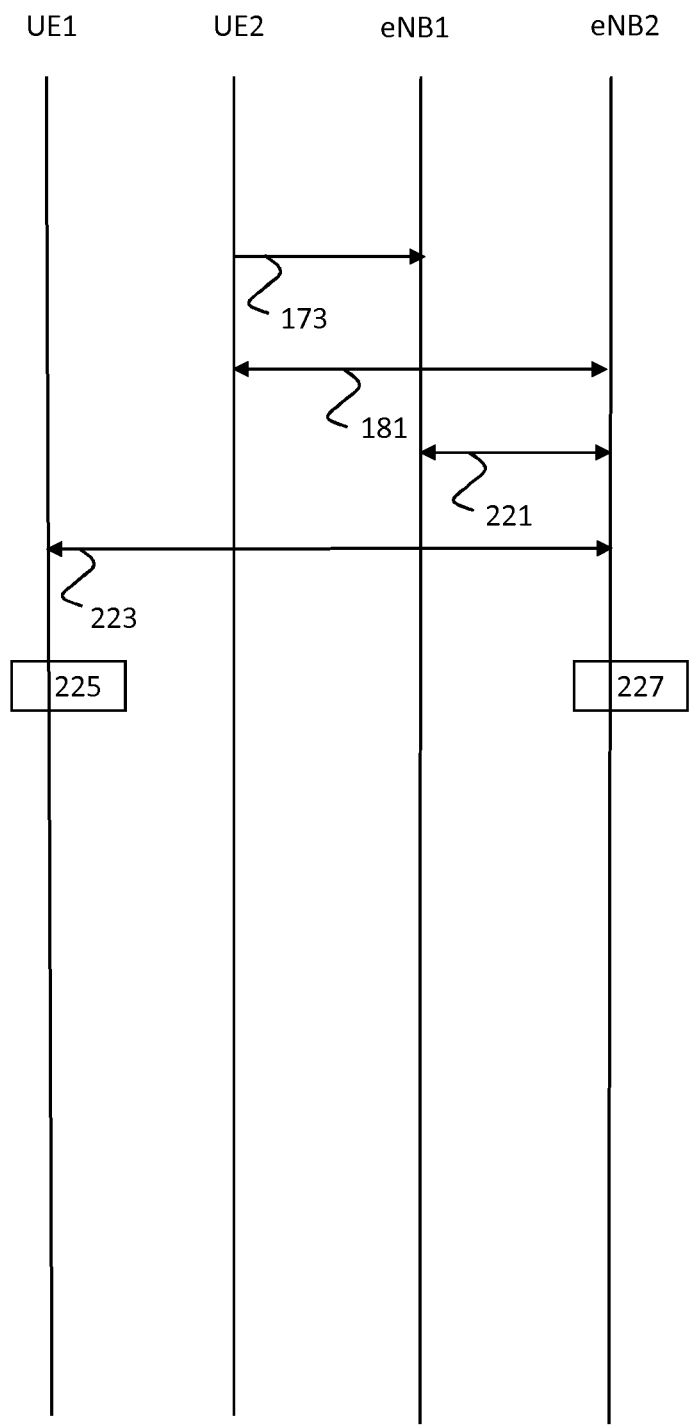
FIG. 9 is a flow diagram showing an example of a further device which is used by a device as relay being handed over to another base station in a second embodiment of the methods.

Situation b) is depicted in FIG. 9 as an example of the second embodiment. In step 173, UE2 signals the need for a handover to eNB1. In step 181, UE2 is handed over to eNB2. In step 221, UE1 is handed over to eNB2. So, eNB1 and eNB2 perform a handover procedure as usual. In addition to the usual procedures, eNB1 hands over the tunnel together with the UE2 security context. Effectively, this means that eNB1 hands over the special relay key and tells the eNB2 that the traffic with a specific DRB-ID will have to be protected using the relay key. Common security practice is to avoid using the same key for prolonged periods of time and so UE1 could be made aware of the handover by eNB2. eNB2 does so by initiating a key refresh procedure and providing a random A to UE1 in step 223. UE1 will respond with random B in this step 223 and these two values are used to derive a new key in both the eNB2 and UE1 in steps 225 and 227. The keys are derived as follows: $K_{eNB\text{-}relay}$=KDF ($K_{eNB}$, FC∥A∥Len∥B∥Len). Key refreshes should preferably happen after a X2-handover to avoid that the same key is known by multiple eNBs.

Figure 10:
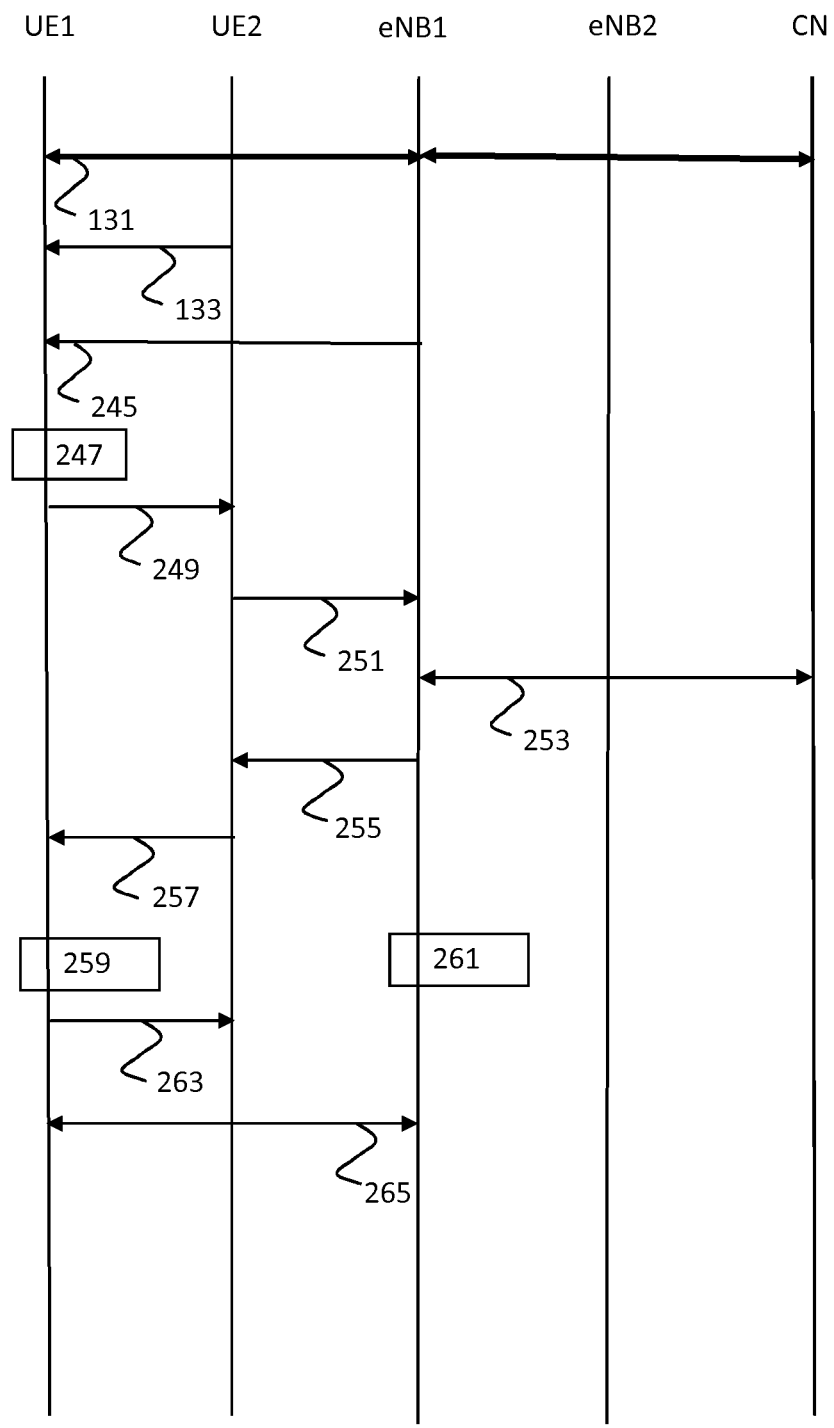
FIG. 10 is a flow diagram showing an example of a device starting to use a further device as a relay in a third embodiment of the methods.

Situation a) is depicted in FIG. 10 as an example of the third embodiment. In this third embodiment, the remote UE observes parameters on the air interface and compares these with the parameters received from the relay UE.

In step 131, UE1 attaches to the network in the normal way and detaches from the radio network, but continues to be registered in the network. In LTE, this state is the EMM registered state. In such a state the UE1 has a security context available, but has no active radio bearers to the network. Effectively, it has a logical connection to the network but no physical one. A UE that is in such a state would first have to setup radio bearers before communication can commence and conversely, the network that receives data for such a UE will first have to page it, wait for it to come back to the network and can only then send data to the UE. It is estimated that UEs are in this state most of the time and it is designed so that UEs can return to active, connected mode quickly. A UE in this mode will monitor the air interface for messages that are of relevance for this UE and may even do proximity discovery using ProSe. In step 133, UE1 discovers a new relay (UE2) based on ProSe (Proximity Services) discovery. UE1 continues to listen to the broadcast messages (SIB messages) in step 245 to monitor the available Cell-Ids and EARFCN values. UE1 stores these values in a list in step 247 and expires Cell-Ids and EARFCN combinations after not having seen them for some time.

In step 249, UE1 connects to UE2 and asks for relay functionality from UE2. In step 251, UE2 asks for relay resources for UE1 from eNB1. eNB1 starts a search to find out who UE1 is in step 253. Since UE1 was in the idle state, UE1 does not have a radio identifier or radio bearer identifier, so UE1 cannot provide this identifier to UE2. One solution is that UE2 forwards the ProSe identifier or GUTI or TMSI of UE1 and that the eNB does a lookup of the identifier via the core network. Of course, UE2 can only know the GUTI or TMSI of the UE1 if UE1 has provided that information in some sort of 'attach' message. This lookup is necessary for eNB1 in order to arrange all the bearers and to get the security context for the UE1 and be able to derive the key that is to be used between the UE1 and the eNB1.

Once the network has identified UE1 in step 253 and agrees to let UE2 act as relay, eNB1 will provide the UE2 with radio resources for the relay and provides UE2 with a bearer identifier for the UE1 traffic in step 255. UE2 provides the parameters to UE1 to derive the $K_{eNB}$ in step 257, namely, the EARFCN and the Cell-Id of the cell it is connected to. In step 259, UE1 checks the parameters with what it observed on the air interface and if they match, UE1 will calculate the $K_{eNB}$ based on the parameters provided by UE2. In step 263, the connection between UE1 and UE2 is setup. The UE1 and eNB1 setup a secure tunnel in step 265 using the key derived by eNB1 in step 261 and by UE1 in step 259. The key is derived as follows: $K_{eNB}^{*}=KDF(K_{eNB},$ FC||Cell ID||Len||EARFCN-DL||Len).

Figure 11:
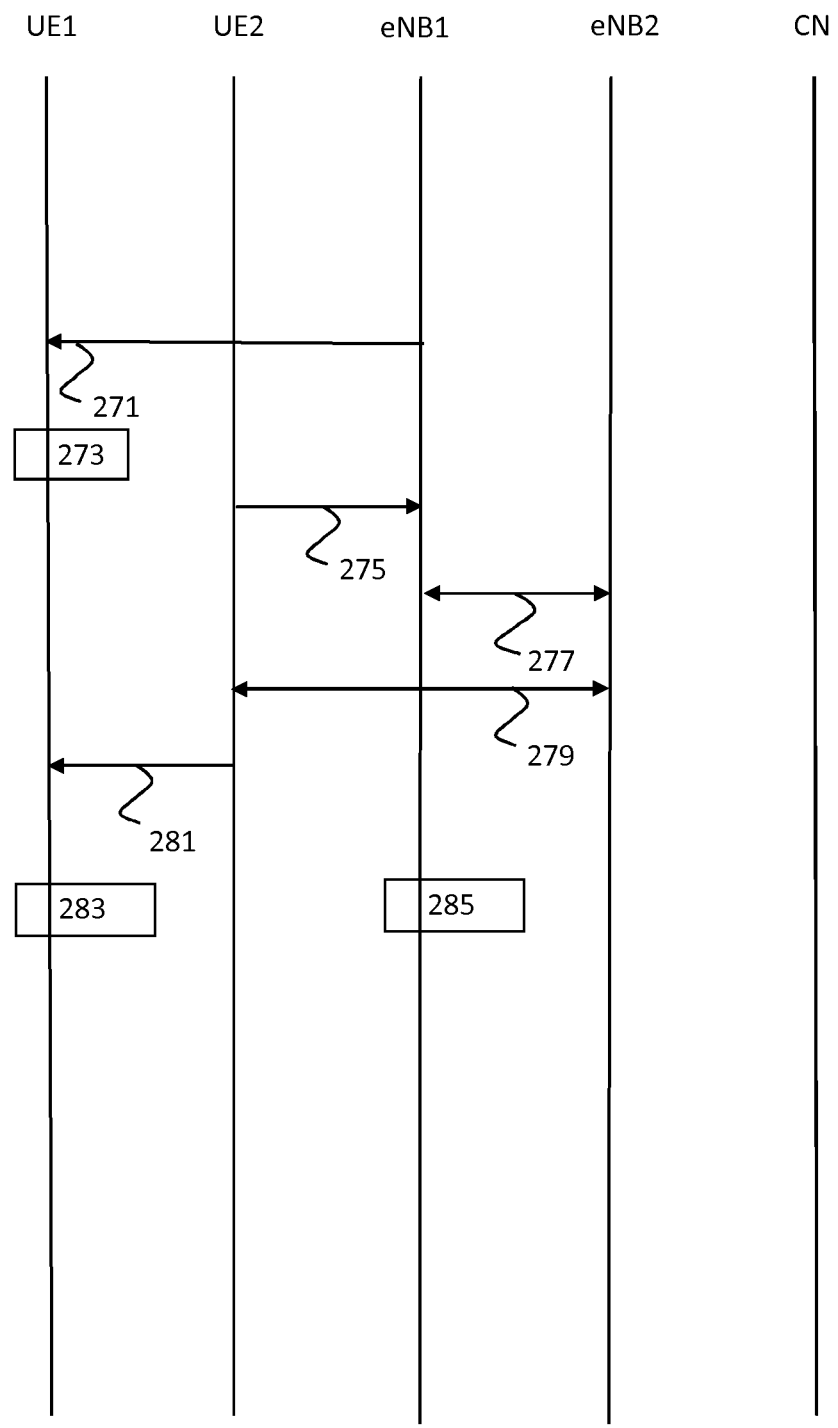
FIG. 11 is a flow diagram showing a first example of the further device of FIG. 10 being handed over to another base station.
Figure 12:
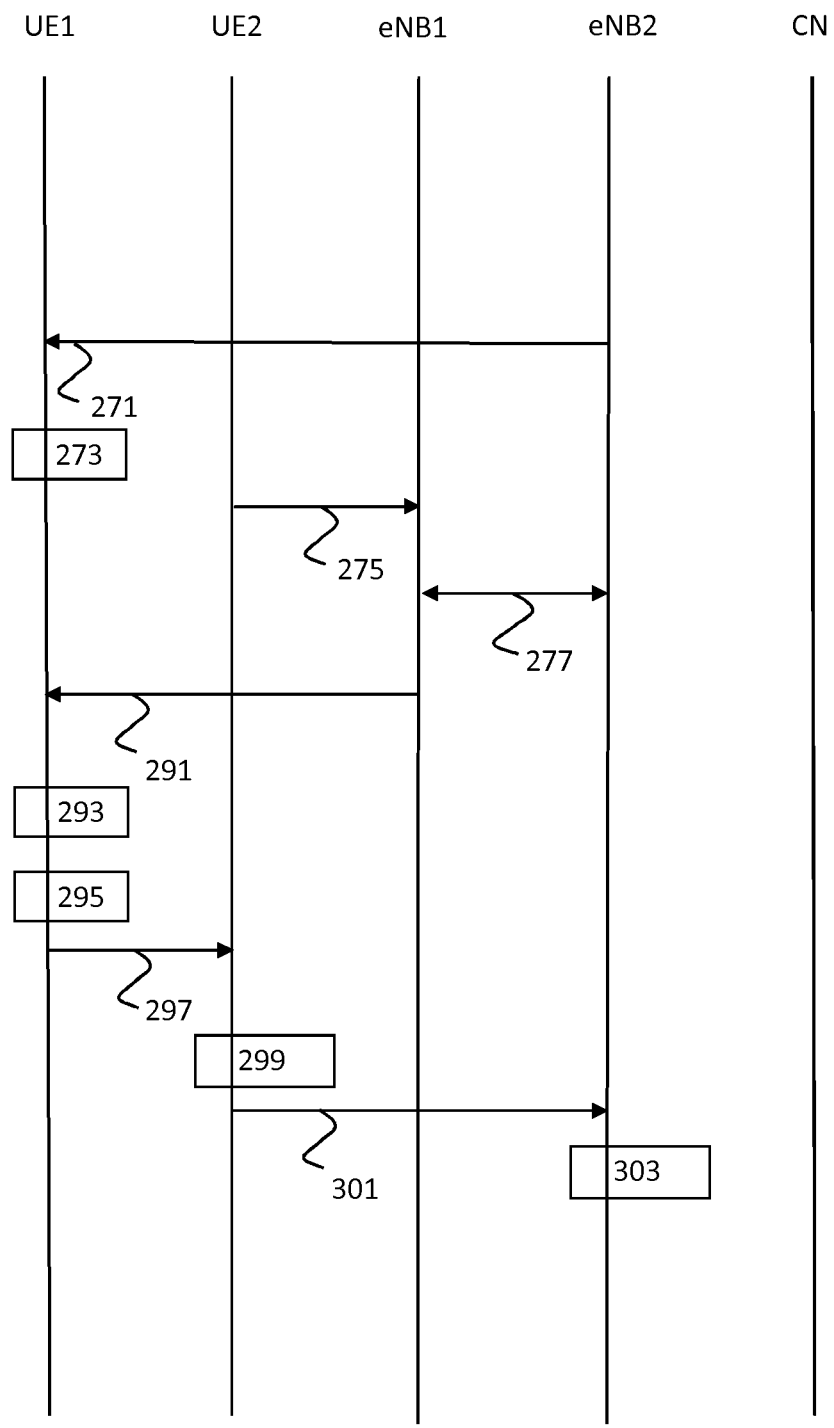
FIG. 12 is a flow diagram showing a second example of the further device of FIG. 10 being handed over to another base station.

Situation b) is depicted in FIG. 11 as an example of the third embodiment. UE1 continues to monitor the air interface for Cell-Id and EARFCN values in step 271 and keeps the database up-to-date in step 273. Alternatively, UE2 could signal UE1 in time that a handover is to be expected, whenever it detects the signal becoming weaker. UE1 could then start monitoring the air interface for SIB messages UE2 signals eNB1 the need for a handover in step 275. UE2 may do this using measurement reports and eNB1 may finally issue the command to handover. UE1 is handed over by eNB1 to eNB2 in step 277 and eNB1 provides the necessary security context. UE1 is handed over while remaining connected to UE2. eNB1 initiates the handover of UE2 from eNB1 to eNB2 in step 279 by running a handover procedure as usual. UE2 is handed over by eNB1 to eNB2 by the network. eNB2 provides the necessary radio resources for both UE2 and UE1 traffic.

Then, UE2 provides UE1 with the parameters about the new eNB2 (Cell-Id and EARFCN) in step 281. In step 283, UE1 checks the parameters with the parameters that it observed on the air interface or that it has obtained differently. The new keys are derived by UE1 and eNB1 in steps 283 and 285 as follows: $K_{eNB}^{*}=KDF(K_{eNB},$ FC||Cell ID||Len||EARFCN-DL||Len).

In the example of FIG. 11, in the handover of UE2 from eNB1 to eNB2, UE2 and eNB2 communicate directly. In an alternative flow diagram shown in FIG. 12, eNB1 sends the handover message protected with an integrity key of UE2 and encrypted with an encryption key of UE1 to UE1 in step 291. UE1 decrypts the message in step 293, reads the contents and forwards it to UE2 in step 297, which can check its integrity in step 299 and be assured that it came from the eNB1. UE1 derives the new key in step 295. UE2 connects to eNB2 in step 301. eNB2 derives the new key in step 303.

In yet another alternative (not shown), eNB1 keeps UE1 informed about possible hand overs. It will send the information about acceptable Cell-Ids and EARFCN combinations regularly to the UE1 so that the UE1 can keep its database up-to-date and can compare to the values that UE2 may sent at a later time.

In another embodiment that involves a slight modification to the third embodiment, UE1 may temporarily be unavailable because it goes into some sort of battery saving mode. For example, in case that UE1 is a smartwatch and UE2 is a smartphone, the two UEs may assume that for most of the day they will not be separated. As such, they may set a reasonable time interval of for example 5 minutes where they exchange a message to check that the other UE is still there. For these cases, UE2 may not always forward the Cell ID and EARFCN immediately, rather it may forward the appropriate values whenever the keep alive message is exchanged. Multiple handovers of UE2 may happen, but steps 285 and 283 of FIG. 11 are only performed whenever the UE1 has received the parameters about the eNB2 in step 281 of FIG. 11, which is every so many minutes agreed between UE1 and UE2. For handovers of UE2 where step 281 is omitted, the eNB will store the respective $K_{eNB}$ that is received during the handover and forward the unmodified $K_{eNB}$ to the next eNB.

Figure 13:
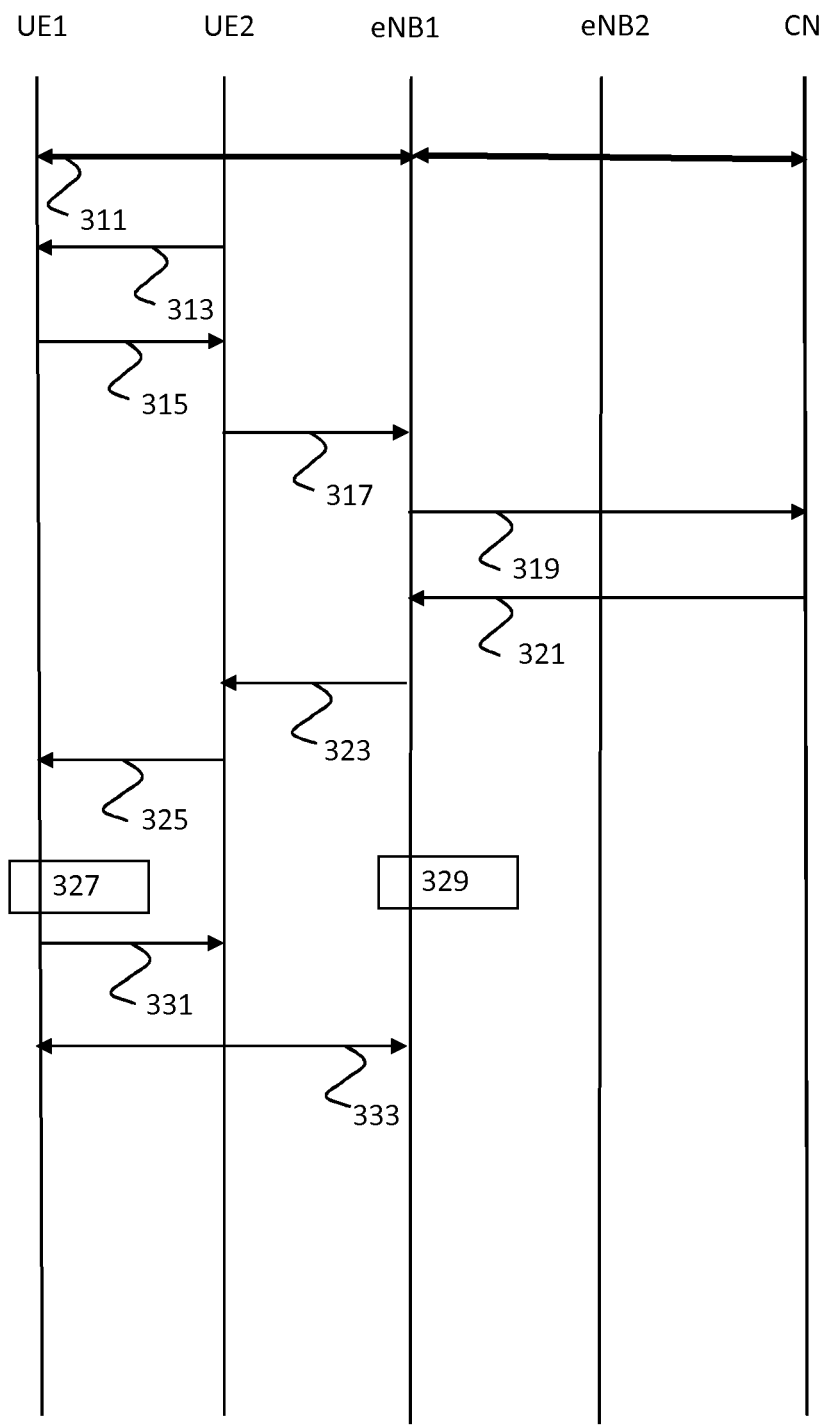
FIG. 13 is a flow diagram showing an example of a device starting to use a further device as a relay in a fourth embodiment of the methods.

Situation a) is depicted in FIG. 13 as an example of the fourth embodiment. In this embodiment, a specific key is derived based on parameters associated with ProSe.

In step 311, UE1 attaches to the network in the normal way and detaches from the radio network, but continues to be registered in the network. In LTE, this state is the EMM registered state. In step 313, UE1 discovers UE2 via a ProSe discovery message. In step 315, UE1 connects to UE2 and asks for relay possibilities from UE2 that is connected to eNB1. In step 317, UE2 asks for relay resources for UE1 from eNB1. In step 319, eNB1 starts a search on the Core Network to find out who UE1 is. Since the UE1 is in the idle state, UE1 has no radio identifier, so UE1 cannot provide this identifier to UE2. One solution is that UE2 forwards the ProSe identifier or GUTI or TMSI of UE1 and that the eNB does a lookup of the identifier via the core network. Of course, UE2 can only know the GUTI or TMSI of the UE1 if UE1 has provided that information in some sort of 'attach' message. This lookup is necessary for eNB1 in order to arrange all the bearers and to get the security context for the UE1 and be able to calculate the key that is used between the UE and the eNB.

In step 321, the Core Network gives permission for UE1 to use UE2 as a relay. In step 323, UE2 receives information about which relay resources have been assigned from eNB1, namely a EARFCN and ProSe 'cell id'. UE2 forwards the resources to UE1 in step 325. If UE1 is connected to the network it may also receive the ProSe resources via eNB1. Both UE1 and eNB1 derive the key based on the resources assigned to the direct mode communication channel between UE1 and UE2 in steps 327 and 329, respectively. The keys are derived as follows: $K_{eNB}$*=KDF ($K_{eNB}$, FC||ProSe ID||Len||Prose Channel||Len). UE1 and UE2 setup the connection in step 331. UE1 and eNB1 setup a secure communication channel in step 333.

Figure 14:
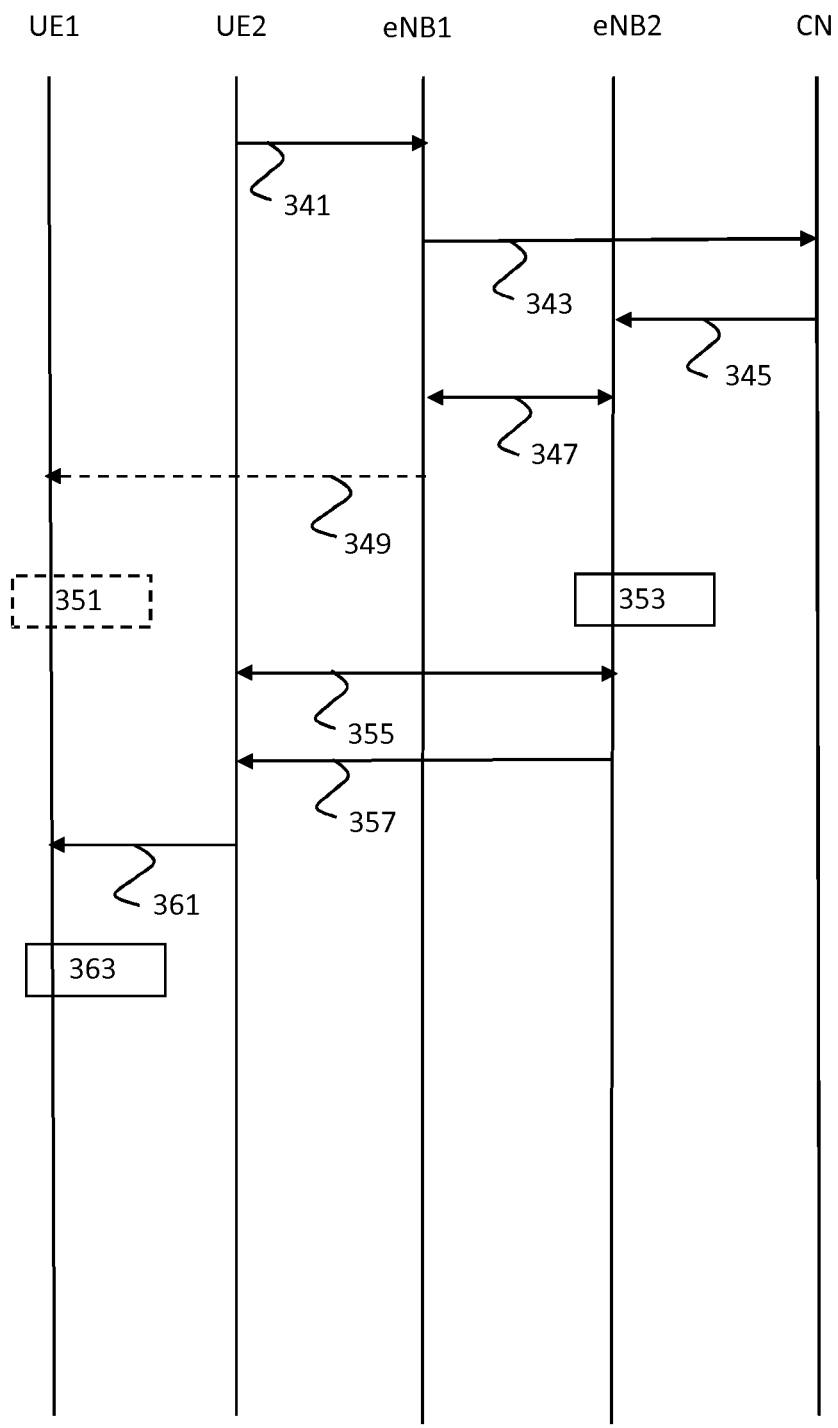
FIG. 14 is a flow diagram showing an example of the further device of FIG. 13 being handed over to another base station.

Situation b) is depicted in FIG. 14 as an example of the fourth embodiment. In step 341, UE2 signals to eNB1 the need for a handover. UE2 may do this using measurement reports and the network may finally issue the command to handover. In step 343, eNB1 request the Core Network to handover the ProSe resources for UE1 and UE2 to eNB2. In step 345, the Core Network informs eNB2 of the assigned ProSe resources. In step 347, eNB1 hands UE1 over to eNB2. Optionally, eNB1 then signals the new ProSe resources to UE1 in step 349 and UE1 derives the new key based on the old $K_{eNB}$ and these new ProSe resources in step 351.

In step 353, eNB2 derives the new key based on the old $K_{eNB}$ and the new ProSe resources. The network initiates the handover of UE2 from eNB1 to eNB2 in step 355 by running a handover procedure as usual. In step 357, eNB2 signals the new ProSe resources to UE2. In step 361, UE2 signals the new ProSe resources to UE1, e.g. if the eNB1 did not signal the new ProSe resources to UE1 in step 349. In step 363, UE1 derives the new key based on the old $K_{eNB}$ and these new ProSe resources, e.g. if UE1 did not derive the new key in step 351. So, UE1 derives the new key in step 351 or step 363 and eNB2 derives the new key in step 353. The new key may be derived as follows: $K_{eNB}$*=KDF($K_{eNB}$, FC||ProSe ID||Len||ProSe Channel||Len).

Figure 15:
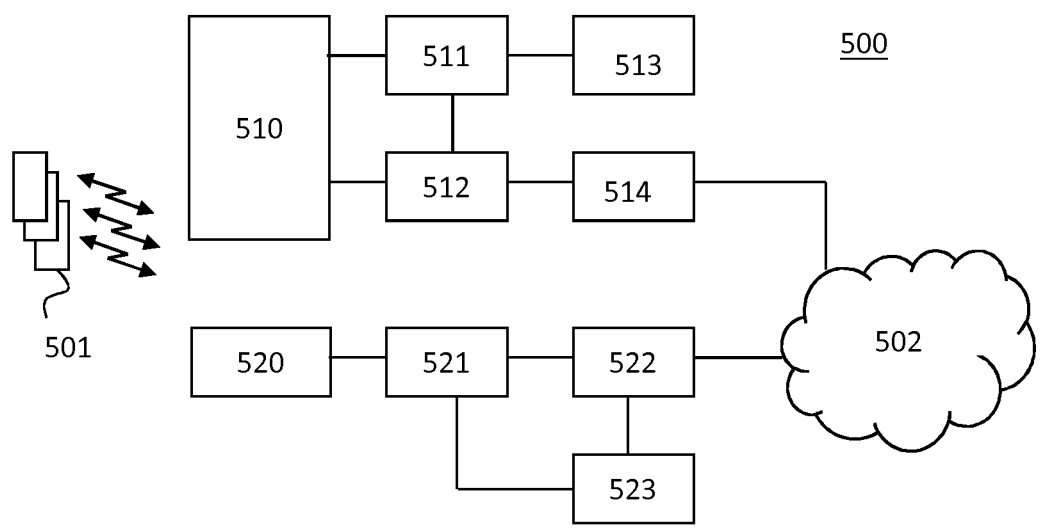
FIG. 15 is a block diagram of an exemplary cellular telecommunication system used in an embodiment of the device and the system of the invention.

In the telecommunications system 500 of FIG. 15, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 15 represents a GSM/GPRS or UMTS network.

For a GSM/GPRS network, a radio access network (RAN) system 520 comprises a plurality of nodes, including base stations (combination of a BSC and a BTS), not shown individually in FIG. 15. The core network system comprises a Gateway GPRS Support Node 522 (GGSN), a Serving GPRS Support Node 521 (SGSN, for GPRS) or Mobile Switching Centre (MSC, for GSM, not shown in FIG. 15) and a Home Location Register 523 (HLR). The HLR 523 contains subscription information for user devices 501, e.g. mobile stations MS.

For a UMTS radio access network (UTRAN), the radio access network system 520 also comprises a Radio Network Controller (RNC) connected to a plurality of base stations (NodeBs), also not shown individually in FIG. 15. In the core network system, the GGSN 522 and the SGSN 521/MSC are connected to the HLR 523 that contains subscription information of the user devices 501, e.g. user equipment UE.

The upper branch of the telecommunications system in FIG. 15 represents a next generation network, commonly indicated as Long Term Evolution (LTE) system or Evolved Packet System (EPS).

The radio access network system 510 (E-UTRAN), comprises base stations (evolved NodeBs, eNodeBs or eNBs), not shown individually in FIG. 15, providing cellular wireless access for a user device 501, e.g. user equipment UE. The core network system comprises a PDN Gateway (P-GW) 514 and a Serving Gateway 512 (S-GW). The E-UTRAN 510 of the EPS is connected to the S-GW 512 via a packet network. The S-GW 512 is connected to a Home Subscriber Server HSS 513 and a Mobility Management Entity MME 511 for signalling purposes. The HSS 513 includes a subscription profile repository SPR for user devices 501.

For GPRS, UMTS and LTE systems, the core network system is generally connected to a further packet network 502, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 16:
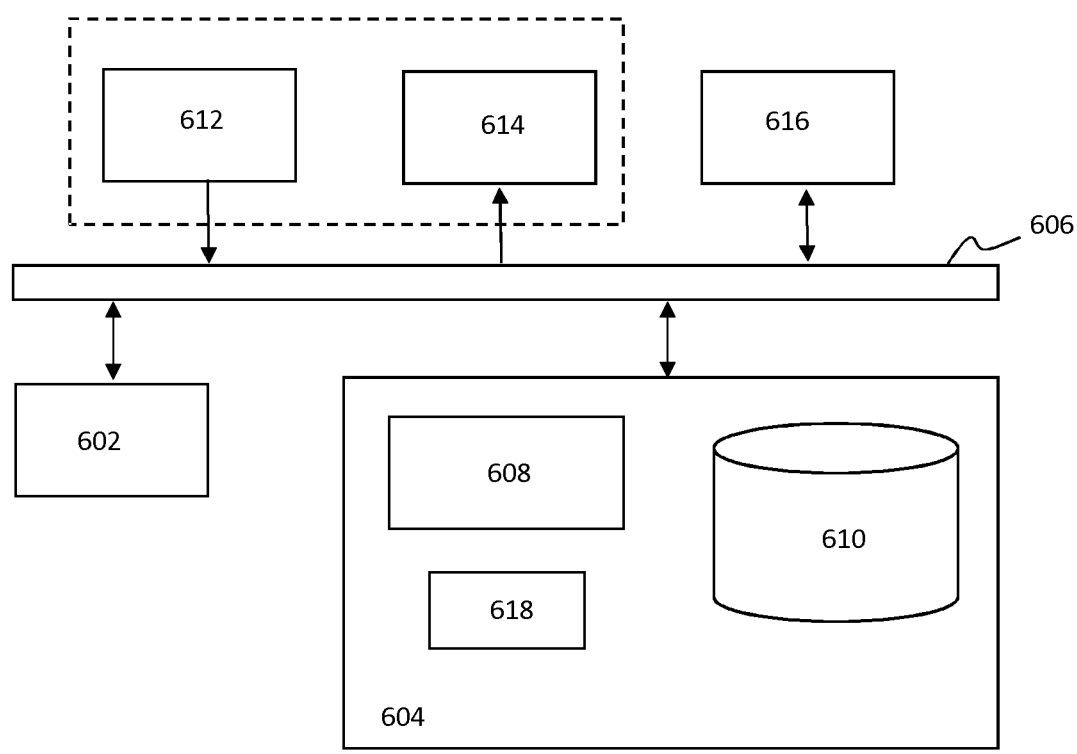
FIG. 16 is a block diagram of an exemplary data processing system for performing the methods of the invention.

FIG. 16 depicts a block diagram illustrating an exemplary data processing system that may perform the methods as described with reference to FIGS. 2 and 3 and FIGS. 5 to 14.

As shown in FIG. 16, the data processing system 600 may include at least one processor 602 coupled to memory elements 604 through a system bus 606. As such, the data processing system may store program code within memory elements 604. Further, the processor 602 may execute the program code accessed from the memory elements 604 via a system bus 606. In one aspect, the data processing system may be implemented as a computer that is suitable for storing and/or executing program code. It should be appreciated, however, that the data processing system 600 may be implemented in the form of any system including a processor and a memory that is capable of performing the functions described within this specification.

The memory elements 604 may include one or more physical memory devices such as, for example, local memory 608 and one or more bulk storage devices 610. The local memory may refer to random access memory or other non-persistent memory device(s) generally used during actual execution of the program code. A bulk storage device may be implemented as a hard drive or other persistent data storage device. The processing system 600 may also include one or more cache memories (not shown) that provide temporary storage of at least some program code in order to reduce the number of times program code must be retrieved from the bulk storage device 610 during execution.

Input/output (I/O) devices depicted as an input device 612 and an output device 614 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 16 with a dashed line surrounding the input device 612 and the output device 614). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 616 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 600, and a data transmitter for transmitting data from the data processing system 600 to said systems, devices and/or networks. Modems, cable modems, and Ethernet cards are examples of different types of network adapter that may be used with the data processing system 600.

As pictured in FIG. 16, the memory elements 604 may store an application 618. In various embodiments, the application 618 may be stored in the local memory 608, he one or more bulk storage devices 610, or separate from the local memory and the bulk storage devices. It should be appreciated that the data processing system 600 may further execute an operating system (not shown in FIG. 16) that can facilitate execution of the application 618. The application 618, being implemented in the form of executable program code, can be executed by the data processing system 600, e.g., by the processor 602. Responsive to executing the application, the data processing system 600 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 602 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A device for transmitting encrypted information to a mobile communication network, the device comprising:
a communication interface; and
at least one processor configured to derive a first security key for secure communications with a first access point of the mobile communication network, the first security key being based on information relating to the first access point, to use the communication interface to request use of or to use a further device as a relay to the mobile communication network, to determine whether the further device is connected to the first access point, and upon determining that the further device is not connected to the first access point:
to derive a second security key based on information relating to a second access point of the mobile communication network to which the further device is connected, the second security key being for secure communications with the second access point, and
to use the communication interface to transmit information to the mobile communication network via the further device, the information being encrypted using the second security key,
wherein the at least one processor is further configured to:
generate a random number and to derive the second security key based on information relating to the second access point and based on the random number generated by the at least one processor; and
use the communication interface to transmit the random number generated by the at least one processor to the further device or to the second access point.

2. The device of claim 1, wherein the at least one processor is further configured to derive the second security key as part of a handover of the device from the first access point to the second access point.

3. The device of claim 2, wherein the at least one processor is further configured to request the handover upon the device receiving a message when another device has determined that the further device is not connected to the first access point.

4. The device of claim 1, wherein the at least one processor is further configured to use the communication interface to connect to the second access point and obtain the information relating to the second access point from the second access point.

5. The device of claim 1, wherein the information relating to the second access point comprises a random number generated by the second access point.

6. The device of claim 1, wherein the information relating to the second access point comprises information obtained by monitoring an air interface and which identifies the second access point.

7. The device of claim 1, wherein the information relating to the second access point comprises information received from the further device.

8. The device of claim 1, wherein the information relating to the second access point comprises information relating to a Proximity Services session between the device and the further device.

9. A system for directing a device for transmitting encrypted information, the system comprising:
a communication interface; and
at least one processor configured to determine whether a device wants to use or is using a further device as a relay to a mobile communication network and upon determining that the device wants to use or is using the further device as a relay to the mobile communication network:
to determine an access point of the mobile communication network with which the device is associated,
to determine a further access point of the mobile communication network to which the device is connected or wants to connect, and
to use the communication interface to direct the device to derive a new security key for secure communications with the further access point based on information relating to the further access point if the access point and the further access point are not the same access point,
wherein the device is configured to:
generate a random number and to derive the new security key based on information relating to the further access point and based on the random number; and
transmit the random number to the further device or to the further access point.

10. A method of transmitting encrypted information from a device to a mobile communication network, the method comprising:
deriving a first security key for secure communications with a first access point of the mobile communication network, the first security key being based on information relating to the first access point;
using or requesting use of a further device as a relay to the mobile communication network;
determining whether the further device is connected to the first access point; and
upon determining that the further device is not connected to the first access point:
deriving a second security key based on information relating to a second access point of the mobile communication network to which the further device is connected, the second security key being for secure communications with the second access point; and
transmitting information to the mobile communication network via the further device, the information being encrypted using the second security key,
wherein the method further comprises:
generating a random number and deriving the second security key based on information relating to the second access point and based on the random number; and
transmitting the random number to the further device or to the second access point.

11. A method of directing a device for transmitting encrypted information, the method comprising:
determining whether a device wants to use or is using a further device as a relay to a mobile communication network; and
upon determining that the device wants to use or is using the further device as a relay to a mobile communication network:
determining an access point of the mobile communication network with which the device is associated;
determining a further access point of the mobile communication network to which the device is connected or wants to connect; and
directing the device to derive a new security key for secure communications with the further access point based on information relating to the further access point if the access point and the further access point are not the same access point,
wherein the device is configured to:
generate a random number and to derive the new security key based on information relating to the further access point and based on the random number; and
transmit the random number to the further device or to the further access point.

12. A non-transitory computer-readable medium having instructions stored thereon for transmitting encrypted information from a device to a mobile communication network, wherein the instructions, when executed by one or more processors, cause the one or more processors to carry out operations including:
deriving a first security key for secure communications with a first access point of the mobile communication network, the first security key being based on information relating to the first access point;
using or requesting use a further device as a relay to the mobile communication network;
determining whether the further device is connected to the first access point; and
upon determining that the further device is not connected to the first access point:
deriving a second security key based on information relating to a second access point of the mobile communication network to which the further device is connected, the second security key being for secure communications with the second access point; and
transmitting information to the mobile communication network via the further device, the information being encrypted using the second security key,
wherein the operations further include:
generating a random number and deriving the second security key based on information relating to the second access point and based on the random number; and
transmitting the random number to the further device or to the second access point.

13. A non-transitory computer-readable medium having instructions stored thereon for directing a device for transmitting encrypted information, wherein the instructions, when executed by one or more processors, cause the one or more processors to carry out operations including:
determining whether a device wants to use or is using a further device as a relay to a mobile communication network; and
upon determining that the device wants to use or is using the further device as a relay to a mobile communication network:
determining an access point of the mobile communication network with which the device is associated;
determining a further access point of the mobile communication network to which the device is connected or wants to connect; and directing the device to derive a new security key for secure communications with the further access point based on information relating to the further access point if the access point and the further access point are not the same access point, wherein the device is configured to:

generate a random number and to derive the new security key based on information relating to the further access point and based on the random number; and transmit the random number to the further device or to the further access point.

14. The device of claim 1, wherein determining that the further device is not connected to the first access point comprises receiving a message when another device has determined that the further device is not connected to the first access point.

15. The method of claim 10, wherein determining whether the further device is connected to the first access point comprises receiving a message when another device has determined that the further device is not connected to the first access point.

16. The non-transitory computer-readable medium of claim 12, wherein determining whether the further device is connected to the first access point comprises receiving a message when another device has determined that the further device is not connected to the first access point.

* * * * *